US008180766B2

(12) United States Patent
Yang et al.

(10) Patent No.: US 8,180,766 B2
(45) Date of Patent: May 15, 2012

(54) BAYESIAN VIDEO SEARCH RERANKING

(75) Inventors: Linjun Yang, Beijing (CN); Jingdong Wang, Beijing (CN); Xian-Sheng Hua, Beijing (CN); Xinmei Tian, Hefei (CN)

(73) Assignee: Microsoft Corporation, Redmond, WA (US)

( * ) Notice: Subject to any disclaimer, the term of this patent is extended or adjusted under 35 U.S.C. 154(b) by 402 days.

(21) Appl. No.: 12/235,509

(22) Filed: Sep. 22, 2008

(65) Prior Publication Data

US 2010/0082614 A1   Apr. 1, 2010

(51) Int. Cl.
*G06F 17/30* (2006.01)
*G06F 7/00* (2006.01)

(52) U.S. Cl. .................. 707/723; 707/726; 707/758

(58) Field of Classification Search ............... 707/999.5, 707/726, 723, 758
See application file for complete search history.

(56) References Cited

U.S. PATENT DOCUMENTS

| | | | | |
|---|---|---|---|---|
| 5,802,361 | A * | 9/1998 | Wang et al. | 382/217 |
| 5,893,095 | A | 4/1999 | Jain et al. | |
| 6,243,713 | B1 * | 6/2001 | Nelson et al. | 1/1 |
| 6,275,820 | B1 * | 8/2001 | Navin-Chandra et al. | 1/1 |
| 6,412,012 | B1 * | 6/2002 | Bieganski et al. | 709/232 |
| 6,738,764 | B2 * | 5/2004 | Mao et al. | 1/1 |
| 7,262,772 | B2 * | 8/2007 | Ebert | 345/440 |
| 7,313,269 | B2 | 12/2007 | Xie et al. | |
| 7,349,895 | B2 | 3/2008 | Liu et al. | |
| 2002/0169754 | A1 * | 11/2002 | Mao et al. | 707/3 |
| 2004/0183815 | A1 * | 9/2004 | Ebert | 345/619 |
| 2005/0131847 | A1 * | 6/2005 | Weston et al. | 706/12 |
| 2006/0004713 | A1 * | 1/2006 | Korte et al. | 707/3 |
| 2006/0106793 | A1 * | 5/2006 | Liang | 707/5 |
| 2006/0165354 | A1 | 7/2006 | Kim | |
| 2007/0094285 | A1 * | 4/2007 | Agichtein et al. | 707/101 |
| 2007/0136263 | A1 * | 6/2007 | Williams | 707/4 |
| 2007/0203942 | A1 | 8/2007 | Hua et al. | |
| 2007/0239778 | A1 * | 10/2007 | Gallagher | 707/104.1 |
| 2007/0255755 | A1 * | 11/2007 | Zhang et al. | 707/104.1 |
| 2008/0005105 | A1 * | 1/2008 | Lawler et al. | 707/6 |
| 2008/0233576 | A1 * | 9/2008 | Weston et al. | 435/6 |
| 2009/0019402 | A1 * | 1/2009 | Ke et al. | 715/849 |
| 2010/0070523 | A1 * | 3/2010 | Delgo et al. | 707/769 |
| 2011/0072012 | A1 * | 3/2011 | Ah-Pine et al. | 707/725 |

OTHER PUBLICATIONS

Hoi, Steven C. H., et al., "A Multimodal and Multilevel Ranking Scheme for Large-Scale Video Retrieval", IEEE Transactions on Multimedia, vol. 10, No. 4, Jun. 2008, pp. 607-619.*
Ewerth, Ralph, et al., "Adapting Appearance Models of Semantic Concepts to Particular Videos via Transductive Learning", MIR '07, Augsburg, Bavaria, Germany, Sep. 28-29, 2007, pp. 187-195.*
Chang, Shih-Fu, et al., "Columbia University TRECVID-2005 Video search and High-Level Feature Extraction", TREC Video Retrieval Evaluation Proceedings, Mar. 2006, pp. 1-9.*
Liu, Jingjing, et al., "Video Search Re-Ranking via Multi-Graph Propagation", MM '07, Augsburg, Bavaria, Germany, Sep. 23-28, 2007, pp. 208-216.*
Nasraoui, Olfa, et al., "Web Recommender System Implementations in Multiple Flavors: Fast and (Care-)Free for All", OSIR 2006, Seattle, WA, Aug. 10, 2006, pp. 46-53.*

(Continued)

*Primary Examiner* — Robert Stevens
(74) *Attorney, Agent, or Firm* — Perkins Coie LLP

(57) ABSTRACT

A general framework for video search reranking is disclosed which explicitly formulates reranking into a global optimization problem from the Bayesian perspective. Under this framework, with two novel pair-wise ranking distances, two effective video search reranking methods, hinge reranking and preference strength reranking, are disclosed. Experiments conducted on the TRECVID dataset have demonstrated that the disclosed methods outperform several existing reranking approaches.

22 Claims, 8 Drawing Sheets

OTHER PUBLICATIONS

Radlinski, Filip, et al., "Query Chains: Learning to Rank from Implicit Feedback", KDD '05, Chicago, IL, Aug. 21-24, 2005, pp. 239-248.*

Beitzel, Steven M., "On Understanding and Classifying Web Queries", Doctor of Philosophy Thesis, Graduate College of the Illinois Institute of Technology, Chicago, IL, May 2006, 96 pages.*

Guo, Zhen, et al., "Enhanced Max Margin Learning on Multimodal Data mining in a Multimedia Database", KDD '07, San Jose, CA, Aug. 12-15, 2007, pp. 340-349.*

Heisele, Bernd, et al., "Feature Reduction and Hierarchy of Classifiers for Fast Object Detection in Video Images", CVPR 2001, vol. 2, © 2001, pp. 11-18-11-24.*

T. V., Ashwin, et al., "Leveraging Non-Relevant Images to Enhance Image Retrieval Performance", Multimedia '02, Juan-les-Pins, France, Dec. 1-6, 2002, pp. 331-334.*

Burer, Samuel, et al., "Rank-Two Relaxation Heuristics for Max-Cut and Other Binary Quadratic Programs", SIAM Journal on Optimization, vol. 12, Issue 2, Nov. 2002, 18 pages.*

T. V., Ashwin, et al., "Adaptable Similarity Search using Non-Relevant Information", Proc. of the 28th VLDB Conf., Hong Kong, China, © 2002, 12 pages.*

Patel, Nilesh, et al., "2. Multimedia Data Mining: An Overview", Multimedia Data Mining and Knowledge Discovery, Part I, © 2007, pp. 14-37.*

"Trec-10," http://trec.nist.gov/pubs/trec10/appendices/measures.pdf (10 pages), 2010.

"TRECVID. TREC Video Retrieval Evaluation," http://www-nlpir.nist.gov/projects/trecvid/ (2 pages) [last accessed Jun. 23, 2008].

Cao, Zhe et al., "Learning to Rank: From Pairwise Approach to Listwise Approach," Microsoft technical report, ICML 2007, ftp://ftp.research.microsoft.com/pub/tr/TR-2007-40.pdf (9 pages).

Carbonell, Jaime et al., "Translingual Information Retrieval: A Comparative Evaluation," In Proceedings of the Fifteenth International Joint Conference on Artificial Intelligence, 1997, http://citeseerx.ist.psu.edu/viewdoc/summary?doi=10.1.1.21.2551 (7 pages).

Cremean, Lars, "Stability Analysis of Interconnected Nonlinear Systems under Matrix Feedback," IEEE 2003, vol. 3, pp. 3078-3083, http://ieeexplore.ieee.org/Xplore/login.jsp?url=/iel5/8969/28482/01273096.pdf?tp=&isnumber=&arnumber=1273096.(6 pages).

Fergus, R. et al., "A Visual Category Filter for Google Images," In proc. ECCV 2004, http://www.robots.ox.ac.uk/~fergus/papers/Fergus_ECCV4.pdf (14 pages).

Herbrich, Ralf et al., "Large Margin Rank Boundaries for Ordinal Regression in Advances in Large Margin Classifiers," MIT Press, Cambridge, MA, Copyright 2000 (22 pages).

Hoi, Steven et al., "A Multimodal and Multilevel Ranking Scheme or Large-Scale Video Retrieval," IEEE Transactions on Multimedia, 2008, pp. 1-13, http://www.cais.ntu.edu.sg/~chhoi/paper_pdf/TMM08MMML_proof.pdf (13 pages).

Hsu, Winston et al., "Reranking Methods for Visual Search," IEEE 2007, pp. 14-22, http://ieeexplore.ieee.org/iel5/93/4287403/04287412.pdf?tp=&arnumber=4287412&isnumber=4287403 (9 pages).

Hsu, Winston et al., "Video Search Reranking through Random Walk over Document-Level Context Graph," ACM 2007, Augsburg, Bavaria, Germany, http://www.ee.columbia.edu/~lyndon/pubs/acmmm2007-rerank.pdf (10 pages).

Hsu, Winston et al., "Video Search Reranking via Information Bottleneck Principle," MM'06, Oct. 23-27, 2006, Santa Barbara, California, USA, (10 pages).

Huang, Timothy et al., "Object Identification in a Bayesian Context," In Proceedings of the Fifteenth International Joint Conference on Artificial Intelligence, 1997, http://dli.iiit.ac.in/ijcai/IJCAI-97-VOL2/PDF/070.pdf (8 pages).

Kennedy, Lyndon et al., "A Reranking Approach for Context based Concept Fusion in Video Indexing and Retrieval," CIVR'07, Jul. 9-11, 2007, Amsterdam, The Netherlands, http://www.ee.columbia.edu/~lyndon/pubs/civr2007-reranking.pdf (8 pages).

Liu, Jingjing et al., "Video Search re-Ranking via Multi-Graph Propagation," Sep. 23-28, 2007, Augsberg, Bavaria, Germany, ACM 2007, pp. 208-217, http://portal.acm.org/citation.cfm?id=1291233.1291279 (10 pages).

Liu, Yuan et al., "Learning to video search rerank via pseudo preference feedback," ICME, 2008, pp. 297-300 (4 pages).

Mei, Tao et al., "MSRA-USTC-SJTU at TRECVID 2007: High-Level Feature Extraction and Search," MSRA at TRECVID 2007, http://www-nlpir.nist.gov/projects/tvpubs/tv7.papers/msra_ustc_sjtu.pdf (12 pages).

Natsev, Apostol et al., "Semantic Concept-Based Query Expansion and reranking for Multimedia Retrieval," MM'07, Sep. 23-28, 2007, Augsburg, Bavaria, Germany, ACM 2007, pp. 991-1000, http://delivery.acm.org/10.1145/1300000/1291448/p991-natsev.pdf?key1=1291448&key2=7083124121&coll=GUIDE&dl=GUIDE&CFID=33672323&CFTOKEN=20701506 (10 pages).

Robertson, S.E. et al., "Simple, proven approaches to text retrieval," In Cambridge University Computer Laboratory Technical Report TR356, Dec. 1994, pp. 1-8 (8 pages).

Smeaton, Alan et al., "Evaluation Campaigns and Trecvid," MIR'06, Oct. 26-27, 2006, Santa Barbara, USA, ACM 2006, 10 pages, http://www.cdvp.dcu.ie/Papers/mir710-Smeaton.pdf (10 pages).

Stern, David et al., "Bayesian Pattern Ranking for Move Prediction in the Game of Go," Proceedings of the 23rd International Conference on Machine Learning, PA, 2006, (8 pages).

Vasconcelos, Nuno et al., "A Bayesian Video Modeling Framework for Shot Segmentation and Content Characterization," IEEE 1997, pp. 59-66, http://ieeexplore.ieee.org/iel3/4980/13686/00629721.pdf?tp=&arnumber=629721&isnumber=13686 (8 pages).

Yan, R. et al., "Co-retrieval A boosted Reranking Approach for Video Retrieval," IEE Proc. Vis, Image Signal Processing, vol. 152, vol. 6, Dec. 2005, pp. 888-895, ieeexplore.ieee.org/iel5/2200/32537/01520877.pdf (8 pages).

Yan, Rong et al., "Multimedia Search with Pseudo-Relevance Feedback," International Conference on Image and Video Retrieval, CIVR'03, Urbana, IL, Jul. 24-25, 2003, www.informedia.cs.cmu.edu/documents/CIVR03-RelFeedback_Final.pdf (10 pages).

Yang, Liu, "Distance metric learning: A comprehensive survey," Department of Computer Science and Engineering, Michigan University, May 19, 2006, pp. 1-51. (51 pages).

Zhou, Dengyong et al., "Learning with Local and Global Consistency," Advances in Neural Information Processing Systems 16, 2004, http://books.nips.cc/papers/files/nips16/NIPS2003_AA41.pdf (8 pages).

Zhu, Xiaojin et al., "Semi-Supervised Learning Using Gaussian Fields and Harmonic Functions," Proceedings of the 20th International Conference on Machine Learning, ICML 2003, Washington DC, 2003, http://learning.eng.cam.ac.uk/zoubin/papers/zgl.pdf (9 pages).

Smola, A.J., "pr LOQO," Oct. 1997, http://www.kernel-machines.org/code/prloqo.tar.gz (12 pages).

* cited by examiner

BAYESIAN VIDEO SEARCH RERANKING

BACKGROUND

Most of the currently available video search engines are based on "query by keyword" scenario, which are built on text search engines mainly using the associated textual information such as surrounding text from the web page, speech transcript, closed caption, and so on. However, the performance of text-based video search is yet unsatisfying, due to the mismatch between surrounding text and the associated video, as well as the low performance of automatic speech recognition (ASR), video text recognition and machine translation (MT) techniques.

FIG. 1 shows a typical process of video search reranking, in which a list of baseline search results is returned through textual information only and visual information is applied to reorder the initial results, so as to refine the text based search results. As illustrated in FIG. 1, after a query, e.g., "Soccer Match", is submitted, an initial ranking list of video segments (i.e., shots in general) is obtained by text search engine based on the relevance between the associated textual information and the query keywords. It is observed that text-based search often returns "inconsistent" results, which means some visually similar ones (and semantically close to each other at the same time in most cases) are scattered in the ranking list, and frequently some irrelevant results are filled between them. For instance, as shown in FIG. 1, four of the top five results of the query "Soccer Match" are the relevant samples and visually similar while the other, the anchor person, is not similar. It is reasonably assumed that the visually similar samples should be ranked together. Such a visual consistency pattern within the relevant samples can be utilized to reorder the initial ranking list, e.g., to assign the anchor person a lower ranking score. Such a process, which reorders the initial ranking list based on some visual pattern, is called content-based video search reranking, or video search reranking in brief.

Video search reranking can be regarded as recovering the "true" ranking list from the initial noisy one by using visual information, i.e., to refine the initial ranking list by incorporating the text cue and visual cue. As for text cue, we mean that the initial text-based search result provides a baseline for the "true" ranking list. Though noisy, it still reflects partial facts of the "true" list thus needs to be preserved to some extent, i.e., to keep the correct information in the initial list. The visual cue is introduced by taking visual consistency as a constraint, e.g., visually similar video shots should have close ranking scores and vice versa. Reranking is actually a trade-off between the two cues. It is worthy emphasizing that this is actually the basic underlying assumption of most of the existing video search reranking approaches, though it may not be clearly presented.

SUMMARY

Content-based video search reranking can be regarded as a process that uses visual content to recover the "true" ranking list from the noisy one generated based on textual information. This paper explicitly formulates this problem in the Bayesian framework, i.e., maximizing the ranking score consistency among visually similar video shots while minimizing the ranking distance, which represents the disagreement between the objective ranking list and the initial text-based. Different from existing point-wise ranking distance measures, which compute the distance in terms of the individual scores, two new methods are proposed in this paper to measure the ranking distance based on the disagreement in terms of pair-wise orders. Specifically, hinge distance penalizes the pairs with reversed order according to the degree of the reverse, while preference strength distance further considers the preference degree. By incorporating the proposed distances into the optimization objective, two reranking methods are developed which are solved using quadratic programming and matrix computation respectively. Evaluation on TRECVID video search benchmark shows that the performance improvement up to 21% on TRECVID 2006 and 61.11% on TRECVID 2007 are achieved relative to text search baseline.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
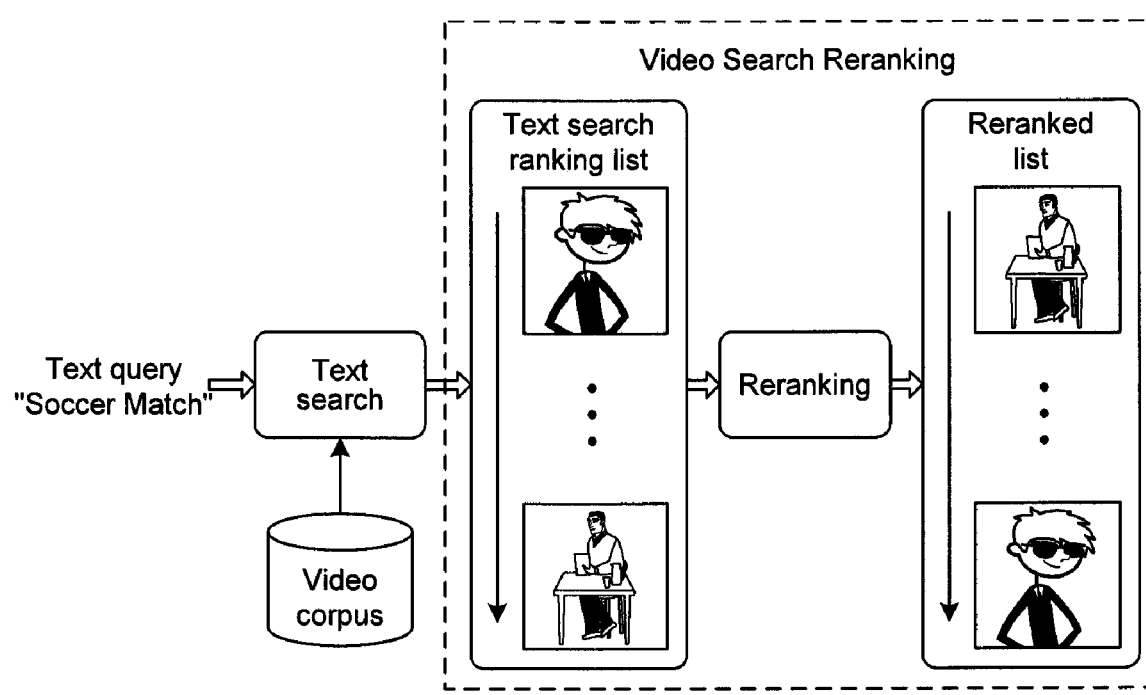
FIG. 1 is an example of video search reranking, which shows existing text search techniques that return relevant video.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "evaluator," "sensor," "device," "cloud," "network," "optimizer," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Two cues from the probabilistic perspective within a Bayesian framework. The text cue is modeled as a likelihood which reflects the disagreement between the reranked list and the initial text-based one; and the visual cue is modeled as a conditional prior which indicates the ranking score consistency between visually similar samples. In the Bayesian framework, reranking is formulated as maximizing the product of the conditional prior and the likelihood. That is the reason that it is referred to herein as Bayesian Reranking. Existing random walk based methods can be unified into such a framework.

The focus is on the likelihood term while the conditional prior can be modeled by visual consistency directly. The likelihood is estimated by the ranking distance, i.e., the disagreement between the reranked list and the initial text-based one. Ranking distance is a crucial factor in video search reranking, which significantly affects the overall reranking performance but has not been well studied before. The point-wise ranking distance, which sums the individual score difference for each sample in the two ranking score lists, is used in existing video search reranking methods. However, such point-wise approach fails to capture the disagreement between two lists in terms of ranking accurately. To tackle this problem, two novel ranking distances are proposed based on the pair-wise order disagreement. Specifically, hinge distance penalizes the pairs with reversed order according to the degree to which they are reversed, while preference strength distance further considers the preference degree over pairs. By incorporating the distances into the optimization objective, hinge reranking and preference strength reranking are developed, which are solved by Quadratic Programming (QP) and matrix computation, respectively.

Firstly, existing video search reranking methods are reviewed. Then, reranking is formulated in a Bayesian framework and the general reranking model is derived. Next, two pair-wise ranking distances are developed and the corresponding reranking methods are presented. Implementation details for video search reranking are next considered. The connections between our proposed methods and "learning to rank" as well as random walk reranking are then presented. Experimental results and analysis are then given.

Recently many methods are proposed for video search reranking, which can be divided into three categories: PRF (Pseudo-Relevance Feedback) based, clustering based and random walk based.

The first category is PRF based. PRF is a concept introduced from text retrieval, which assumes that a fraction of the top-ranked documents in the initial search results are pseudo-positive. In PRF based video search reranking there are normally three steps: (1) select the pseudo-positive and pseudo-negative samples from the initial text-based search results; (2) train a classifier using the selected samples; (3) rerank the video shots with the relevance scores predicted by the trained classifier. Due to the low performance of text-based video search, the top ranked video shots cannot be used as pseudo positives directly. Alternatively, uses the query images or example video clips as the pseudo-positive samples. The pseudo-negative samples are selected from either the least relevant samples in the initial ranking list or the database with the assumption that few samples in the database are relevant to the query. In step (2), different classifiers, such as SVM, Boosting, and Ranking SVM, can be adopted. Although the above classifiers are effective, sufficient training data are demanded to achieve a satisfactory performance since a lot of parameters need to be estimated.

The second category is clustering based. In some prior art, each video shot is given a soft pseudo label according to the initial text-based ranking score, and then the Information Bottleneck principle is adopted to find optimal clustering which maximizes the mutual information between the clusters and the labels. Reranked list is achieved by ordering the clusters according to the cluster conditional probability firstly and then ordering the samples within a cluster based on their local feature density estimated via kernel density estimation. This method achieves good performance on the named-person queries as shown in while it is limited to those queries which have significant duplicate characteristic.

In the third category, random walk based methods, a graph is constructed with the samples (video shots) as the nodes and the edges between them being weighted by multi-modal similarity. Then, reranking is formulated as random walk over the graph and the ranking scores are propagated through the edges. To leverage the text-based search result, a "dongle" node is attached to each sample with the value fixed to be the initial text-based ranking score. The stationary probability of the random walk process is used as the reranked score directly. Random walk reranking can be unified into the proposed Bayesian reranking framework, while the adopted ranking distance is actually point-wise, which can not capture the "true" difference between the reranked list and the initial text-based one precisely.

There are also methods which incorporate auxiliary knowledge, including face detection, query example, and concept detection, into video search reranking. Though the incorporation of auxiliary knowledge leads to the performance improvement it is not a general treatment. They suffer from either the limited applicability to the specific queries (face detection), the desire of the specific uses interfaces (query example) or the limited detection performance and small vocabulary size (concept detection). In this paper, we only consider the general reranking problem which doesn't assume any auxiliary knowledge besides the visual information of samples.

Before formulating reranking, a few terms are defined below.

DEFINITION 1. A ranking score list (score list in brief), $r=[r_1, r_2, \ldots, r_N]^T$, is a vector of the ranking scores, which corresponds to a sample set $X=\{x_1, x_2, \ldots, x_N\}$.

DEFINITION 2. A ranking list 1 is a permutation of X sorted by the ranking scores with descending order.

Generally, reranking can be regarded as a mapping from the initial ranking list to the objective ranking list. However, the ranking scores are also useful in most situations. For this reason, we define reranking on the score list instead of the ranking list.

DEFINITION 3. A reranking function is defined as $$r=f(X, \bar{r}), \qquad (1)$$

where $\bar{r}=[\bar{r}_1, \bar{r}_2, \ldots, \bar{r}_N]^T$ the initial ranking score list. Permutating the samples according to this reranking function is called reranking.

By defining reranking on the score list instead of the ranking list more flexibility will be achieved. For the application scenarios where the initial ranking scores are un available, such as Google image search reranking, the initial score list $\bar{r}$ can be set according to the initial rank of samples.

The difficulty in reranking is how to derive the optimal reranking function (1). The reranking problem is investigated from the probabilistic perspective and derives an optimal reranking function based on Bayesian analysis.

Supposing the ranking score list is a random variable, reranking can be regarded as a process to derive the most probable score list given the initial one as well as the visual content of samples. From the probabilistic perspective reranking is to derive the optimum r* with the maximum a posterior probability given the samples X and the initial score list $\bar{r}$:

$$r^*=\arg\max_r p(r|X, \bar{r}). \qquad (2)$$

According to Bayes' formula, the posterior is proportional to the product of the conditional prior probability and the likelihood $$p(r|X, \bar{r}) \alpha p(r|X) \times p(\bar{r}|X, r), \qquad (3)$$

where $p(r|X)$ is the conditional prior of the score list given the visual content of samples. For instance, the ranking score list with dissimilar scores for visually similar video shots may be assigned a small probability.

$p(\bar{r}|X, r)$ is the likelihood, which expresses how probable the initial score list $\bar{r}$ is given the "true" ranking score list r. It can be estimated based on the ranking distance which represents the disagreement between the reranked score list and the initial one, as discussed later.

In most of the video search systems, the initial ranking score list is obtained by using the textual information regardless of the visual content, therefore the conditional independency assumption of the visual information X and the initial score list $\bar{r}$ given the objective score list r can be made, i.e., $$p(\bar{r}, X|r)=p(\bar{r}|r) \times p(X|r), \qquad$$

hence, $$p(\bar{r}|X, r)=p(\bar{r}|r). \qquad (4)$$

Substituting (4) into (3) we obtain $$p(r|X, \bar{r}) \alpha p(r|X) \times p(\bar{r}, r) \qquad (5)$$

Replacing the posterior in (2) with (5), we formulate reranking as maximizing the product of a conditional prior and a likelihood, which is defined as Bayesian Reranking.

DEFINITION 4. Bayesian Reranking is reranking using the function $$f(X, \bar{r}) = \underset{r}{\arg\max}\, p(r|X) \times p(\bar{r}|r), \qquad (6)$$

where $\bar{r}$ is the initial ranking score list, and X is the corresponding samples.

In Bayesian Reranking, the likelihood and the conditional prior need to be estimated to complete the reranking function. Below, it will be shown how to model the prior and likelihood using energy functions.

In video search reranking, it is expected that visually similar video shots should have close ranking scores. This can be modeled in the conditional prior in the Bayesian Reranking formulation. Specifically, the conditional prior is formulated as a pair-wise Markov network, $$p(r|X) = \frac{1}{Z}\exp\left(-\sum_{i,j}\psi_{ij}(r, X)\right),$$

where $\Psi_{ij}(r, X)$ is the energy function defined on a pair of samples $\{r_i, x_i, r_j, x_j\}$, Z is a normalizing constant with $Z=\Sigma_r \exp(-\Sigma_{i,j}\Psi_{ij}(r, X))$.

Figure 2:
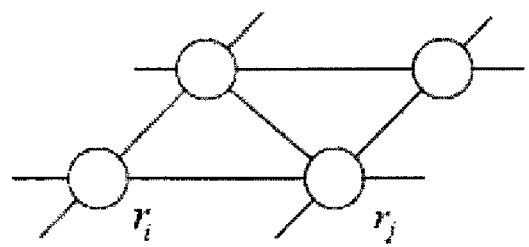
FIG. 2 is graphical model representation for the conditional prior of the ranking list, wherein a graph G is built with the ranking scores as notes while edges being weighted by the visual similarities.

A graph G, as illustrated in FIG. 2, is constructed with nodes being the scores in r while weights on edges being the similarities between the corresponding samples. Specifically, the weight $\omega_{ij}$ on the edge between nodes $r_i$ and $r_j$ can be computed using Gaussian kernel, $$\omega_{ij} = \exp\left(-\frac{\|x_i - x_j\|^2}{2\sigma^2}\right),$$

where σ is the scaling parameter.

Various methods can be used to derive the energy function $\Psi_{ij}(r|X)$. Based on the assumption that if the samples $x_i$ and $x_j$ are visually similar then the corresponding scores $r_i$ and $r_j$ should be close as well and vice versa, so-called visual consistency assumption, the energy function is defined as $$\psi_{ij}(r, X) = \frac{1}{2}w_{ij}(r_i - r_j)^2, \qquad (7)$$

hence the conditional prior is $$p(r|X) = \frac{1}{Z}\exp\left(-\frac{1}{2}\sum_{i,j}w_{ij}(r_i - r_j)^2\right), \qquad (8)$$

which is widely used in semi-supervised learning, and the exponent is named as Laplacian Regularization. An alternative method, Normalized Laplacian Regularization can also be used to derive the prior, $$p(r|X) = \frac{1}{Z}\exp\left(-\frac{1}{2}\sum_{i,j} w_{ij}\left(\frac{r_i}{\sqrt{d_i}} - \frac{r_j}{\sqrt{d_j}}\right)^2\right), \quad (9)$$

where $d_i = \Sigma_j w_{ij}$.

From the experimental analysis, Laplacian Regularization performs better than Normalized Laplacian Regularization.

Figure 3:
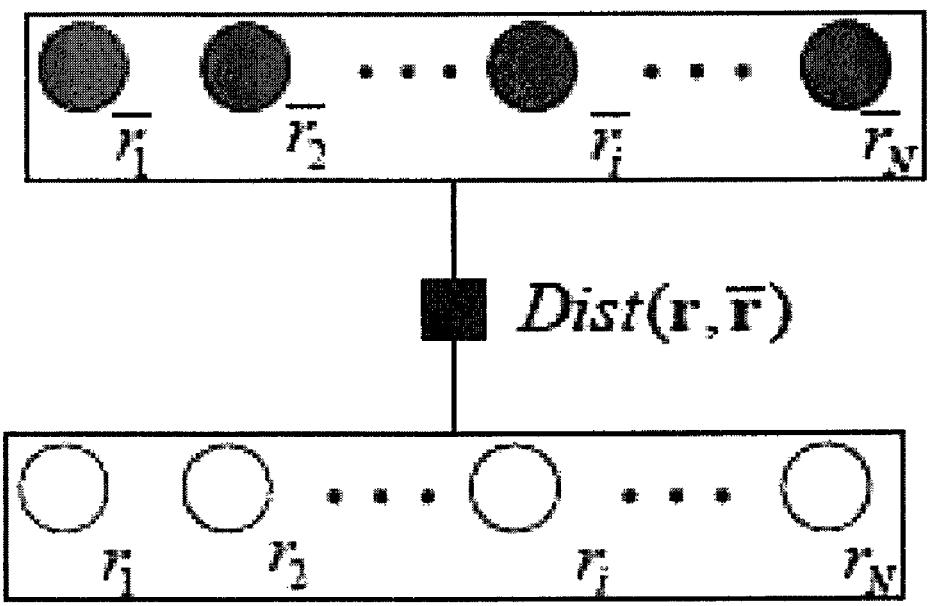
FIG. 3 is a factor graph representation of the ranking distance between to variables.

The likelihood is modeled as $$p(\bar{r}|r) = \frac{1}{Z}\exp(-c \times Dist(r, \bar{r})), \quad (10)$$

where Z is the normalizing constant, c is a scaling parameter, and $Dist(r, \bar{r})$ is the ranking distance representing the disagreement between the two ranking score list, which will be discussed in detail in Section 4. The graphical model representation is illustrated in FIG. 3.

TABLE 1

A toy example for ranking distance

| Samples | $x_1$ | $x_2$ | $x_3$ | $x_4$ | $x_5$ |
|---|---|---|---|---|---|
| $r^0$ | 1.0 | 0.9 | 0.8 | 0.7 | 0.6 |
| $r^1$ | 0.6 | 0.7 | 0.8 | 0.9 | 1.0 |
| $r^2$ | 1.5 | 0.7 | 0.8 | 0.9 | 1.0 |
| $r^3$ | 0.5 | 0.4 | 0.3 | 0.2 | 0.1 |

The Bayesian Reranking formulation in Eq. (6) is equivalent to minimizing the following energy function, $$E(r) = \Sigma_{ij} w_{ij}(r_i - r_j)^2 + c \times Dist(r, \bar{r}), \quad (11)$$

where the first and second terms correspond to the conditional prior in Eq. (8) and the likelihood in Eq. (10) respectively, and c can be viewed as a trade-off parameter to the two terms. The main work of this paper focuses on the second term, i.e., the evaluation of ranking distance.

In the below we will analyze the issues in existing ranking distances and propose to measure the ranking distance from the pair-wise perspective. A toy example is given for illustration, which comprises five samples $\{x_1, x_2, x_3, x_4, x_5\}$ and four ranking score lists $\{r^0, r^1, r^2, r^3\}$, as shown in Table 1.

Sorting the samples by their scores, the corresponding ranking lists are derived from $r^0, r^1, r^2, r^3$ as $$1^0 = \langle x_1, x_2, x_3, x_4, x_5 \rangle,$$

$$1^1 = \langle x_5, x_4, x_3, x_2, x_1 \rangle,$$

$$1^2 = \langle x_1, x_5, x_4, x_3, x_2 \rangle,$$

$$1^3 = \langle x_1, x_2, x_3, x_4, x_5 \rangle,$$

To measure the ranking distance between the score lists, one intuitive idea is to take each score list as an "instance" and then use the list-wise approach, which has been exploited in "learning to rank". However, as shown in some prior art, which defines the distance of two score lists as the cross entropy between the two distributions of permutations conditioned respectively on the each of the score lists, the list-wise approach is computationally intractable since the number of permutations is O(N!) where N is the number of samples.

Alternatively, the most direct and simple method to measure the ranking distance between two score lists is to compute the individual score difference for each sample respectively and then sum them, so-called point-wise approach, as shown below, $$Dist(r, \bar{r}) = \Sigma_i d(r_i, \bar{r}_i) = \Sigma_i (r_i - \bar{r}_i) \quad (12)$$

Figure 4:
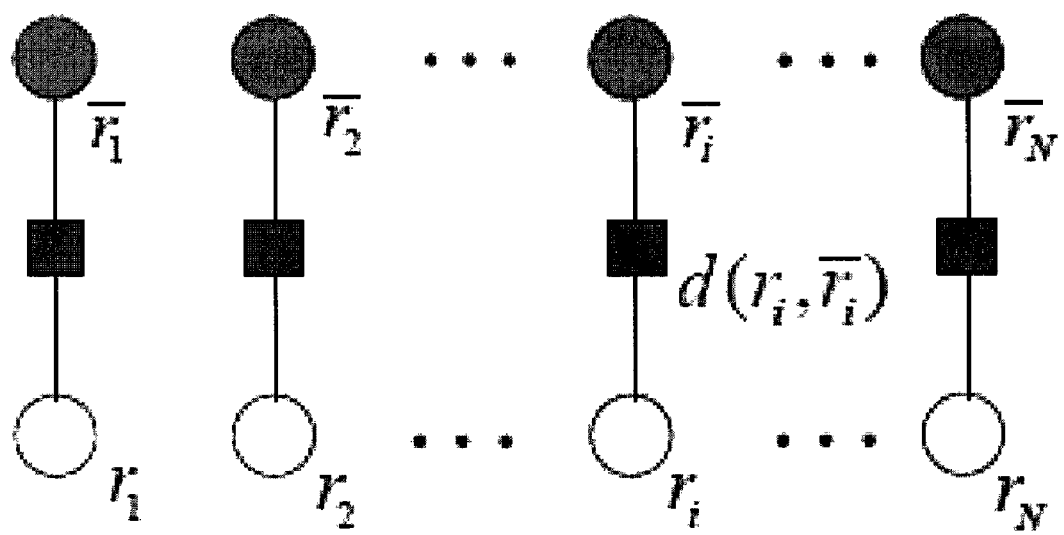
FIG. 4 is a factor graph representation of point-wise ranking distance in which the ranking distance is computed by summing each sample's distance.

The corresponding graphical model representation is illustrated in FIG. 4. Such a point-wise approach has been applied in random walk reranking with a slightly different form.

Point-wise ranking distance, however, fails to capture the disagreement between the score lists in terms of ranking in some situations. Take the toy example in Table 1 for illustration. The distances between $r^0$ and $r^1, r^2, r^3$ computed using Eq. (12) are: $Dist(r^1, r^0) = 0.63$, $Dist(r^2, r^0) = 0.70$, and $Dist(r^3, r^0) = 1.12$. $Dist(r^3, r^0)$ is the largest, however, in terms of ranking, the distance between $r^3$ and $r^0$ should be the smallest since $1^3$ is identical with $1^0$ while different from $1^1$ and $1^2$.

Figure 5:
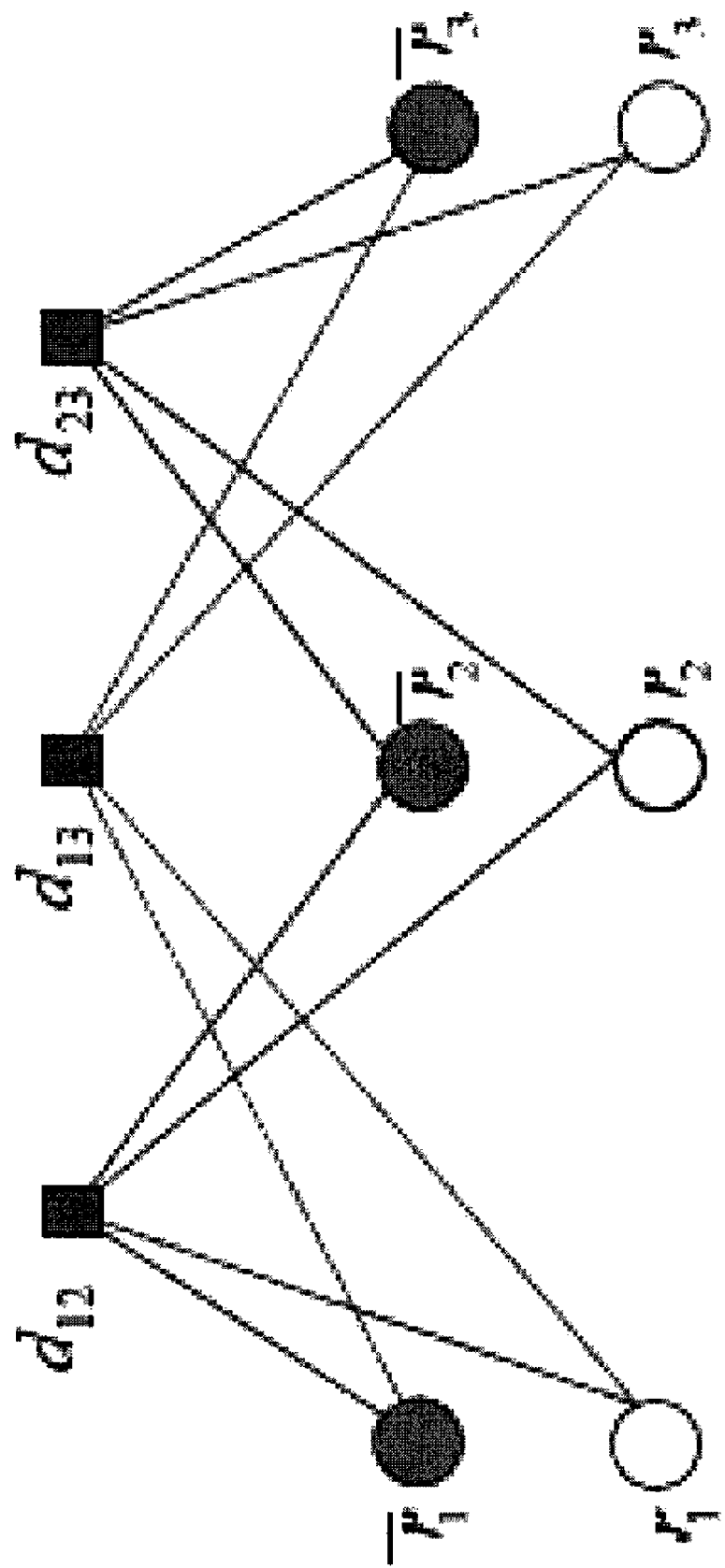
FIG. 5 is a factor graph representation of pair-wise ranking distance in which the ranking distance is computed by summing each pair's distance.

As the ranking information can be represented entirely by the pair-wise ordinal relations, the ranking distance between two score lists can be computed from the pairs, so-called pair-wise approach. The graphical model representation of pair-wise distance is illustrated in FIG. 5.

Before further discussing pair-wise approach, we firstly define the notation $\succ_r$.

DEFINITION 5. $x_i \succ_r x_j$ is a relation on a pair $(x_i, x_j)$ if $r_i > r_j$, i.e., $x_i$ is ranked before $x_j$ in the ranking list 1 derived from r.

All the pairs with $(x_i, x_j)$ satisfying $x_i \succ_r x_j$ compose a set $S_r = \{(i,j): x_i \succ_r x_j\}$. For any two samples $x_i$ and $x_j$ either $(i, j)$ or $(j, i)$ belongs to $S_r$. Therefore, all the pair-wise ordinal relations are reflected in $S_r$.

The simplest pair-wise ranking distance could be defined as below, $$Dist(r, \bar{r}) = \Sigma_{(i,j) \in S_r} \delta(x_j \succ_{\bar{r}} x_i) \quad (13)$$

where $$\delta(t) = \begin{cases} 1, & t = \text{true} \\ 0, & t = \text{false}. \end{cases}$$

The basic idea of (13) is to count the number of pairs which disagree on the order relations in the two lists. Using (13), $Dist(r^1, r^0) = 10$, $Dist(r^2, r^0) = 6$, and $Dist(r^3, r^0) = 0$. It really captures the differences of the ranking lists.

However, the optimization problem of (11) with the ranking distance (13) is computationally intractable. Below we will define two pair-wise ranking distances with which the optimization problem of (11) can be solvable.

The following description describes hinge reranking. Intuitively, if a pair's order relation keeps the same before and after reranking, the distance of this pair will be zero, just as shown in (13). However, if a pair's order is reversed after reranking, instead of giving equal penalization (1 in (13)) for each pair, the penalization should be given according to the degree to which the pair's order is reversed. Hence, we define hinge distance as $$Dist(r, \bar{r}) = \sum_{(i,j) \in S_{\bar{r}}} d((r_i, r_j), (\bar{r}_i, \bar{r}_j)) \quad (14)$$

$$= \sum_{(i,j) \in S_{\bar{r}}} [(r_j - r_i) + ]^2,$$

-continued where $$(x)_+ = \begin{cases} 0, & x \leq 0 \\ x, & x > 0 \end{cases}$$

is the hinge function.

Substitute hinge distance (14) into (11) and the following optimization problem is derived $$\min_r \frac{1}{2} \sum_{i,j} w_{ij}(r_i - r_j)^2 + c \sum_{(i,j) \in S_{\bar{r}}} [(r_j - r_i)_+]^2,$$

which is equivalent to $$\min_r \frac{1}{2} \sum_{i,j} w_{ij}(r_i - r_j)^2 + c \sum_{(i,j) \in S_{\bar{r}}} \xi_{ij}^2 \quad (15)$$

$$\text{s.t. } r_i - r_j > -\xi_{ij}, \text{ when } x_i \succ_{\bar{r}} x_j,$$

where $\xi_{ij}$ is a slack variable.

By introducing a factor a which is a small positive constant the following quadratic optimization problem is achieved, $$\min_r \frac{1}{2} \sum_{i,j} w_{ij}(r_i - r_j)^2 + c \sum_{(i,j) \in S_{\bar{r}}} \xi_{ij}^2 \quad (16)$$

$$\text{s.t. } r_i - r_j \geq a - \xi_{ij}, \text{ when } x_i \succ_{\bar{r}} x_j.$$

Reranking with the above optimization problem is called hinge reranking since hinge distance is adopted. The optimization problem (16) can be solved using Interior-Point method. In some situations the computational cost is high especially when the constraints are excessive. For instance, if there are 1000 samples in the initial ranking list, there will be about one million constraints. Below, we will develop a more efficient method using a different ranking distance, which can be solved analytically by matrix computation.

In reranking, not only the order relation but also the preference strength, which means the score difference of the samples in a pair, i.e., $r_i - r_j$ for the pair $(x_i, x_j)$, is indicative. For example, given two pairs, one comprising two tigers with different typicality, and the other comprising a tiger and a stone, obviously the preference strength is different for these two pairs. Such information can be utilized in video search reranking and then an alternative ranking distance is defined, called preference strength distance, as follows $$Dist(r, \bar{r}) = \sum_{(i,j) \in S_{\bar{r}}} d((r_i, r_j), (\bar{r}_i, \bar{r}_j)) \quad (17)$$

$$= \sum_{(i,j) \in S_{\bar{r}}} \left(1 - \frac{r_i - r_j}{\bar{r}_i - \bar{r}_j}\right)^2.$$

From Eq. (17) we can see that with preference strength the order relations on pairs are also reflected in preference strength ranking distance.

Replacing the distance function in (11) with the preference strength distance (17), the optimization problem of preference strength reranking is $$\min_r \frac{1}{2} \sum_{i,j} w_{ij}(r_i - r_j)^2 + c \sum_{(i,j) \in S_{\bar{r}}} \left(1 - \frac{r_i - r_j}{\bar{r}_i - \bar{r}_j}\right)^2. \quad (18)$$

Supposing one solution of (18) is r*, it is apparent that $\hat{r} = r^* + \mu e$ is also the solution of (18), where e is a vector with all elements equal 1 and $\mu$ is an arbitrary constant. Obviously, all solutions give the same ranking list. Here, a constraint $r_N = 0$ is added to (18) where N is the length of r and then the unique solution can be derived, as given in the following proposition.

PROPOSITION 1. The solution of (18) with a constraint $r_N = 0$ is $$r = \frac{1}{2} \check{L}^{-1} \check{c},$$

where $\check{L}$ and $\check{c}$ are obtained by replacing the last row of $\tilde{L}$ with $[0, 0, \ldots, 0, 1]_{1 \times N}$ and last element of $\tilde{c}$ with zero respectively. $\tilde{L} = \tilde{D} - \tilde{W}$ and $\tilde{c} = 2c(Ae)^T$. $\tilde{W} = [\tilde{w}_{ij}]_{N \times N}$ with $\tilde{w}_{ij} = w_{ij} + c\alpha_{ij}^2$. $\tilde{D} = Diag(\tilde{d})$ is a degree matrix with $\tilde{d} = [\tilde{d}_1, \ldots, \tilde{d}_N]^T$ and $\tilde{d}_i = \sum_j \tilde{w}_{ij}$. $A = [\alpha_{ij}]_{N \times N}$ is a anti-symmetric matrix with $\alpha_{ij} = 1/(\bar{r}_i - \bar{r}_j)$.

PROOF.

$$\min_r \frac{1}{2} \sum_{i,j} w_{ij}(r_i - r_j)^2 + c \sum_{(i,j) \in S_{\bar{r}}} (1 - \alpha_{ij}(r_i - r_j))^2 =$$

$$\min_r \frac{1}{2} \begin{pmatrix} \sum_{i,j} w_{ij}(r_i - r_j)^2 + \\ c \sum_{(i,j) \in S_{\bar{r}}} \alpha_{ij}^2 (r_i - r_j)^2 \end{pmatrix} - 2c \sum_{(i,j) \in S_{\bar{r}}} \alpha_{ij}(r_i - r_j) + const =$$

$$\min_r \frac{1}{2} \sum_{i,j} (w_{ij} + c\alpha_{ij}^2)(r_i - r_j)^2 - 2c \sum_{(i,j) \in S_{\bar{r}}} \alpha_{ij}(r_i - r_j) =$$

$$\min_r \frac{1}{2} \sum_{i,j} \tilde{w}_{ij}(r_i - r_j)^2 + 2c \sum_{(i,j) \in S_{\bar{r}}} \alpha_{ij}(r_i - r_j) = \min_r r^T \tilde{L} r - \tilde{c}^T r$$

Take derivatives and equate it to zero gives:

$$2\tilde{L}r = \tilde{c} \quad (19)$$

The solution of (19) is non-unique since the Laplacian matrix $\tilde{L}$ is singular. With the constraint $r_N = 0$, we can replace the last row of $\tilde{L}$ with $[0, 0, \ldots, 0, 1]_{1 \times N}$ to obtain $\check{L}$ and the last element of $\tilde{c}$ with zero to obtain $\check{c}$ respectively. Then, the solution is $$r = \frac{1}{2} \check{L}^{-1} \check{c}$$

As aforementioned, there are two methods for reranking. When applied into video search reranking some implementation details should be considered.

As can be observed in Eq. (11), ranking distance is actually employed to preserve the information of initial score list to some extent. Currently, all the pairs in $S_{\bar{r}}$ are involved; however, it will be better to preserver a portion of the pairs, i.e., a subset of $S_{\bar{r}}$ in some situations where the initial score list is very noisy. Below, we will introduce some methods to select the appropriate pairs.

Clustering (C)

Directly use the pair selection method proposed in prior methods. In this method, the pseudo-positive samples are selected by clustering and then the bottom-ranked samples in the initial ranking list are selected as pseudo-negative. Each one of the pseudo-positive samples and one of the pseudo-negative samples are selected to form a pseudo-positive pair.

Top and Bottom (TB)

Usually, the samples ranked at the top of the initial ranking list are more likely to be positive than those which are ranked at the bottom. Based on this assumption, the top-ranked samples in the initial ranking list are selected as pseudo-positive and the bottom-ranked samples as pseudo-negative and then formed into pseudo-positive pairs.

ρ-adjacent

The ρ-adjacent pair is defined as below.

DEFINITION 6. A pair $(x_i, x_j)$ which satisfies $0 < l_{x_i} - l_{x_j} \leq \rho$, where $l_{x_i}$ and $l_{x_j}$ are the ranks of $x_i$ and $x_j$ in ranking list 1 derived from score list r, is ρ-adjacent pair in 1 (or ρ-adjacent pair in r).

For a ranking list $1=\{x_1, x_2, \ldots, x_N\}$, the 1-adjacent pairs are $\{(x_1, x_2), (x_2, x_3), \ldots, (x_{N-1}, x_N)\}$. It is apparent that all other pairs can be deduced from the 1-adjacent pairs based on the transition property of the pair relation $\succ_r$. From this perspective 1-adjacent pairs actually preserve all the necessary information of the ranking list. However, as can be seen from the optimization objectives that the preservation of pair relations is not hard due to the trade-off parameter c, other pairs than the 1-adjacent ones could also be useful. To be noted is that all the pairs in $S_{\bar{r}}$ are used when $\rho = N-1$ where N is the sample count in the ranking list.

In video search, the performance of text baseline is often poor and the text scores are mostly unreliable because of the inaccuracy and mismatch of ASR and MT from the video. Besides, in some situations the text search scores are unavailable for reranking, e.g., in web image search. There are three strategies disclosed to assign the initial scores.

Normalized Text Score (NTS)

The initial scores $\bar{r}$ can be assigned by normalizing the text scores $\bar{r}^{text}$ into [0, 1] as follows $$\bar{r}_i = \frac{r_i^{text} - r_{min}^{text}}{r_{max}^{text} - r_{min}^{text}}.$$

Normalized Rank (NR)

The normalized rank is widely used to estimate the sample's relevance probability, which will be employed to assign the initial scores as $$\bar{r}_i = 1 - i/N, i = 1, \ldots, N.$$

Rank (R)

Different from NR, the rank can be used directly as the initial score without normalization $$\bar{r}_i = N - i, i = 1, \ldots, N.$$

Firstly we define the ranking function analogical to reranking function.

DEFINITION 7. A ranking function is defined as $$r = f(K)$$

where $K = \{k_j\}$ is a set of features with $k_j$ being extracted from the pair comprising the query q and the sample $x_j$ and r is the objective ranking score list.

The goal of most "learning to rank" methods is to learn a ranking function automatically from the training data, $$f^* = \arg\max_f p(f \mid \{K^i, r^i\}_{i=1}^m), \quad (20)$$

and then predict the ranking score list of the samples under a test query $q_t$ using the learned ranking function, $$r^t = f^*(K^t),$$

where $K^t$ is the test feature set extracted from pairs of the test query $q_t$ and samples, $\{K^i, r^i\}_{i=1}^m$ is the training data comprising m pre-labeled ranking lists for m queries $\{q_i\}$.

Reranking can be formulated as a learning to rank problem. Firstly a fraction of the initial ranking score list is selected based on some strategy as shown in Section 5.1; then the selected fractions of the initial ranking list are used to learn an optimal ranking function; finally the reranked list can be achieved using the learned ranking function. This is actually the method used in some prior art, which adopts Ranking SVM to learn a pair-wise ranking function.

The problem (20) can be regarded as inductive learning to rank, which learns an explicit ranking function without utilizing the unlabeled data. In reranking, however, an explicit ranking function is not necessarily needed and what we desire is just the reranked score list. A more effective way should be to deduce the optimal ranking list from this training data directly without explicitly learning a ranking function as $$r^t = \arg\max_r p(r \mid K^t, \{K^i, r^i\}_{i=1}^m), \quad (21)$$

which corresponds to the transduction paradigm in machine learning.

Rewriting the reranking objective (2) as $$r^* = \arg\max_r p(r \mid X, \{X, \bar{r}\}). \quad (22)$$

Since in reranking only one query is involved the features are extracted from the samples regardless of the query. Except this the objective (21) and (22) have the same form. We can see that reranking is actually transductive learning to rank with only one training sample, i.e. the initial ranking score list. From this perspective, the proposed hinge reranking and preference strength reranking can be applied as transductive learning to rank method as well. Meanwhile, any transductive learning to rank methods which will be developed in the future can be used for reranking seamlessly.

The objective function of random walk reranking is derived as $$\frac{1}{2}\sum_{i,j} w_{ij}\left(\frac{r_i}{d_i} - \frac{r_j}{d_j}\right)^2 + \sum_i \frac{1}{d_i}(r_i - \bar{r}_i)^2,$$

from which we can see that random walk reranking actually have the similar objective as Bayesian Reranking (11). The two terms in the objective function correspond to the visual consistency regularization and the normalized point-wise ranking distance respectively.

Next, the reranking methods are evaluated on a widely used video search benchmark and compared to several existing approaches. Also discussed is the influence of different implementation strategies and parameters in our methods.

The experiments were conducted on the TRECVID 2006 and 2007 video search benchmark. TRECVID 2006 dataset consists of 259 videos with 79,484 shots while TRECVID 2007 dataset consists of 109 videos with 18, 142 shots. The data are collected from English, Chinese, and Arabic news programs, accompanied with automatic speech recognition (ASR) and machine translation (MT) transcripts in English provided by NIST.

The text search baseline we used in this paper is based on the Okapi BM-25 formula using ASR/MT transcripts at shot level. For each of the 48 queries, 24 for TRECVID 2006 and TRECVID 2007 respectively, at most top 1400 relevant shots are returned as initial text search result.

The low-level feature we used in reranking is 225-dimensional block-wise color moments extracted over 5×5 fixed grid partitions, each block of which is described by a 9-Dimensional feature. When constructing the graph G, each sample is connected with its K-nearest neighbors.

The performance is measured by the widely used non-interpolated Average Precision (AP). We average the APs over all the 24 queries in each year to get the Mean Average Precision (MAP) to measure the overall performance.

Our two methods are compared: hinge reranking and Preference Strength (PS) reranking with random walk and Ranking SVM PRF. In addition, we also compare them with two graph based transductive learning methods: GRF (Gaussian Random Filed) and LGC (Local and Global Consistency), which have the same form of objective functions as (11) so can be adopted into reranking directly. For GRF the point-wise ranking distance (12) and Laplacian regularization (8) are used while for LGC the point-wise ranking distance (12) and the Normalized Laplacian regularization (9) are adopted.

TABLE 2

MAP comparison between different reranking methods on TRECVID 2006 and 2007.

| Method | TRECVID 2006 | | TRECVID 2007 | |
|---|---|---|---|---|
| | MAP | Gain | MAP | Gain |
| Text Baseline | 0.0381 | — | 0.0306 | — |
| Random Walk | 0.0398 | 4.46% | 0.0318 | 3.90% |
| Ranking SVM PRF | 0.0421 | 10.50% | 0.0315 | 2.94% |
| GRF | 0.0430 | 12.86% | 0.0321 | 4.90% |
| LGC | 0.0424 | 11.29% | 0.0351 | 14.71% |
| Hinge Reranking | 0.0399 | 4.72% | 0.0493 | 61.11% |
| PS Reranking | 0.0461 | 21.00% | 0.0445 | 45.42% |

The ρ-adjacent strategy for pair selection and R strategy for initial score are adopted in our methods. The parameters are selected in global optimum for all the methods. However, in hinge reranking, K is fixed to 30 when constructing the graph G and only the top 500 samples in the text search result are involved considering for the efficiency in practical application.

The experimental results are summarized in Table 2. PS reranking achieves consistent and significant performance improvements on both years, 21% on TRECVID 2006 and 45.42% on TRECVID 2007. Hinge reranking performs the best and obtains 61.11 % improvement on TRECVID 2007 while little improvement is achieved on TRECVID 2006. As aforementioned, in hinge reranking, we only rerank the top 500 samples. However, the percentage of the positive samples in the top 500 among all the positive samples in the text based search result is 65.9% on TRECVID 2006. The remaining 34.1% positive samples beyond the top 500 will keep untouched in reranking.

Figure 6:
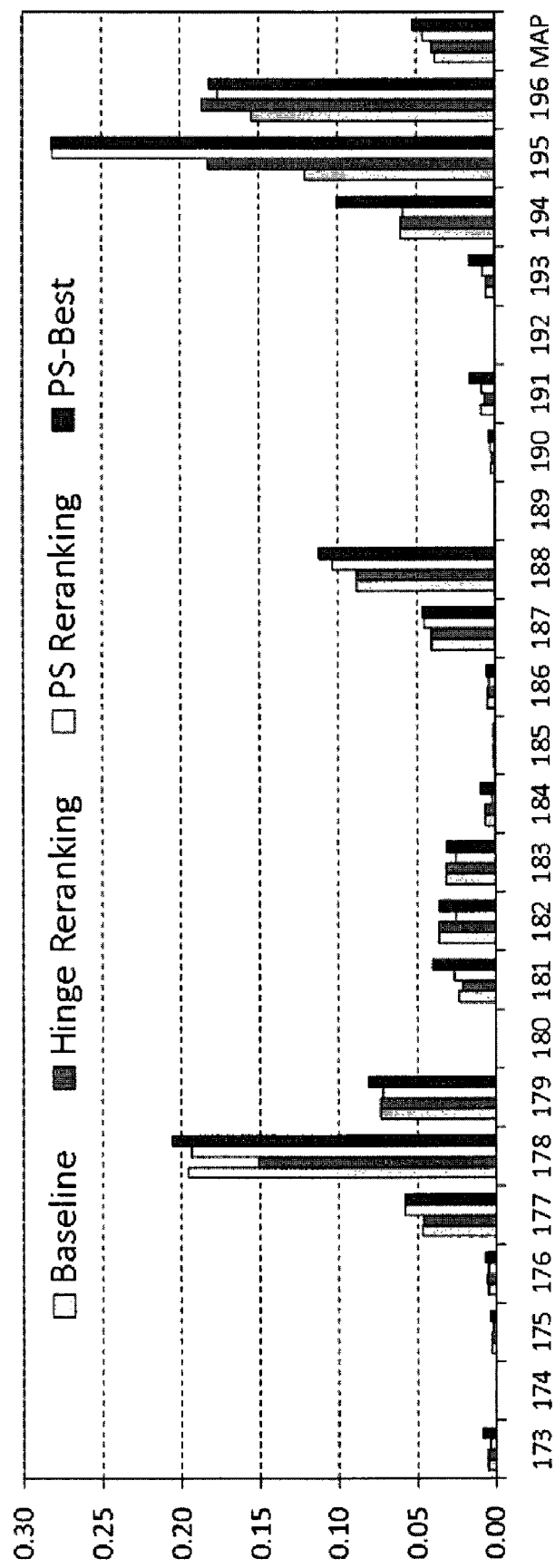
FIG. 6 illustrates a performance chart of hinge reranking and PS reranking on TRECVID 2006.
Figure 7:
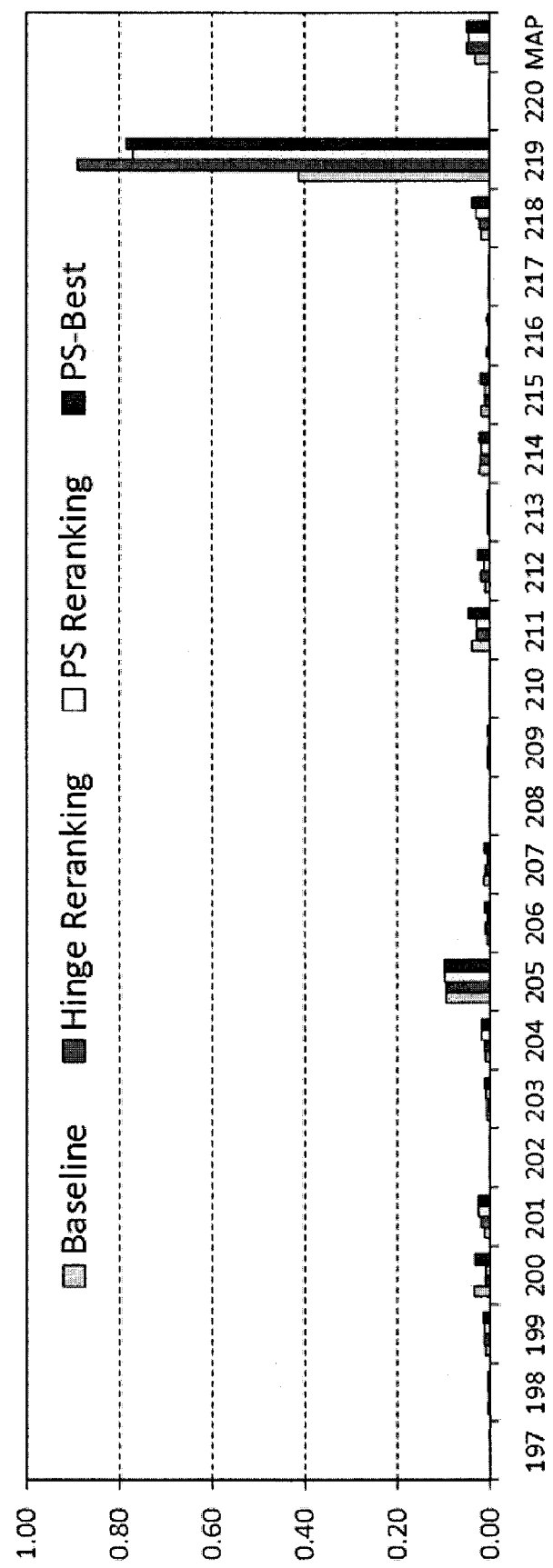
FIG. 7 illustrates a performance chart of hinge reranking and PS reranking on TRECVID 2007.

The performances of the proposed methods on each query in TRECVID 2006 and 2007 are illustrated in FIG. 6 and FIG. 7. As can be seen, the proposed hinge reranking and PS reranking methods achieve performance improvements on most of the queries relative to the text search baseline. Significant improvements are obtained on some queries, such as query188 ("burning with flames visible"), query195 ("soccer goalposts"), query196 ("scenes with snow"), and query219 ("the Cook character in the Klokhuis series"). For these queries, the relevant samples share high visual similarity, which is coherent with the visual consistency assumption. Remarkable improvements on these queries demonstrate also the effectiveness of the proposed consistency regularization. On the other hand, for these queries, the text search baselines are better than the others so that the minimization of the ranking distance, i.e., the second term in the objective function (11), captures more useful information.

It can also be seen that the performances on some queries degrade after reranking, such as query182 ("soldiers or police with one or more weapons and military vehicles") and query200 ("hands at a keyboard typing or using a mouse"). There could be two reasons. One is that the low-level feature is insufficient to represent the visual content with large variations. Hence, in the future semantic similarity will be incorporated into reranking methods. The other reason is that the parameters are set to be the same for each query, which is obviously not optimal. The performances of queries with optimal parameters for each in PS reranking (PS-Best) are shown in the last column of FIG. 6 and FIG. 7 from which we can see that almost all queries have significant improvements while no queries suffer obvious loss. In the future, we will develop some methods to select optimal parameters for each query or query class automatically.

Below, the performance of the proposed methods and strategies is analyzed. If not explicitly stated, the experiments and analysis are conducted on PS reranking since the QP solving in hinge reranking is extremely slow when the constraints are excessive.

Pair selection is a useful pre-processing step for video search reranking especially when the initial ranking score list is very noisy, as detailed in Section 5.1.

Figure 8:
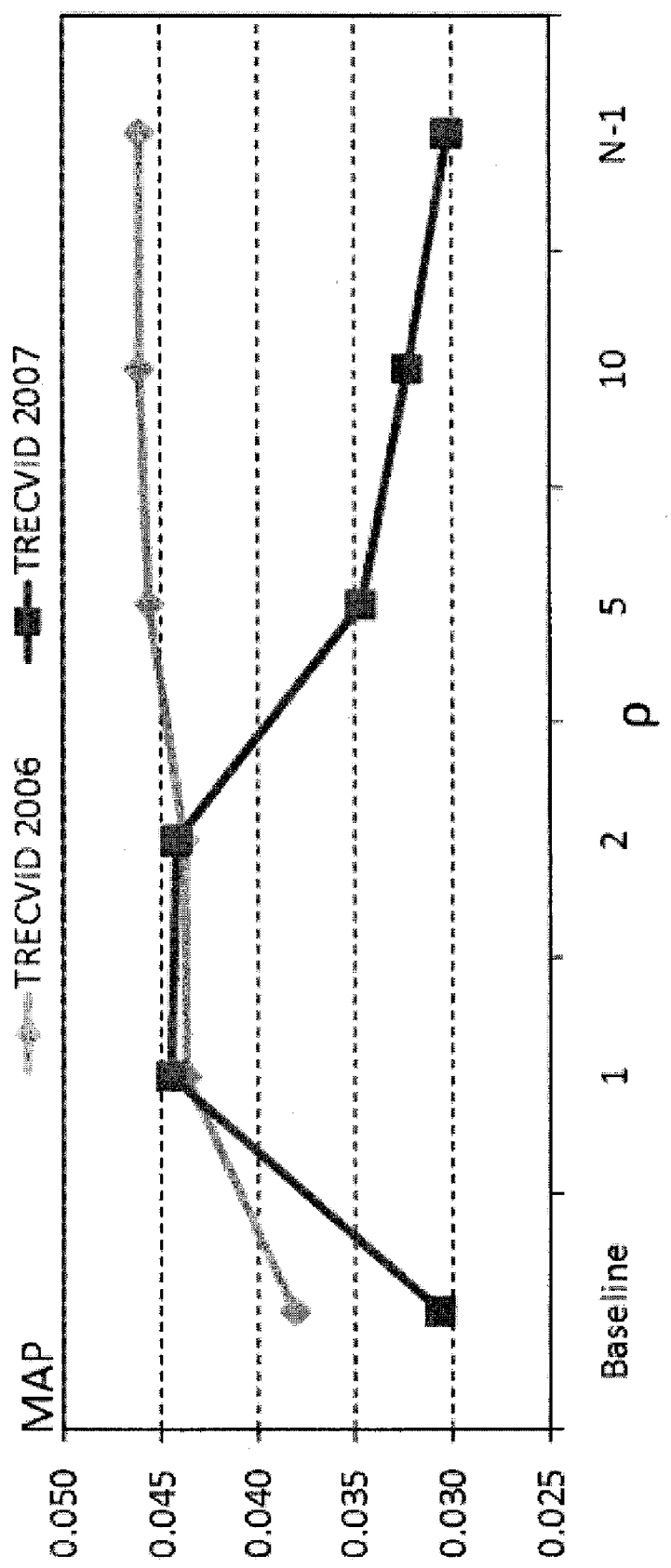
FIG. 8 illustrates a performance chart of p-adjacent pairs.

Firstly, we conduct the experiments using ρ-adjacent pairs with different ρ. As shown in FIG. 8 1-adjacent pairs achieve significant performance improvements relative to the baseline on both TRECVID 2006 and 2007. The reason may be that 1-adjacent pairs have actually preserved all the necessary information in terms of ranking.

As illustrated in FIG. 8, the performance increases with ρ growing on TRECVID 2006. On TRECVID 2007 the performance degrades when more pairs are added. By observing the data, we argue the reasons are: (1) the text search

TABLE 3

MAP comparison of pair selection strategies.

| Method | TRECVID 2006 | | TRECVID 2007 | |
|---|---|---|---|---|
| | MAP | Gain | MAP | Gain |
| Text Baseline | 0.0381 | — | 0.0306 | — |
| C | 0.0408 | 7.09% | 0.0227 | −25.82% |
| TB | 0.0418 | 9.71% | 0.0120 | −60.78% |
| ρ-adjacent | 0.0461 | 21.00% | 0.0445 | 45.42% | baseline on TRECVID 2007 is noisier so that better preservation of the initial result is not beneficial; (2) For query219 ("the Cook character in the Klokhuis series"), which basically dominates the performance of TRECVID 2007 as illustrated in FIG. 7, there are only six relevant ones among the 575 samples in the text search baseline, so that preserving the order of the pairs far from each other in the initial ranking list brings no useful information but noises. In the following experiments, we will set ρ=1 for TRECVID 2006 and ρ=N−1 for TRECVID 2007.

The performance of ρ-adjacent pair selection is compared with the other strategies in Table 3. As shown, ρ-adjacent outperforms the others on both TRECVID 2006 and 2007 data set though the other two methods generate more "correct" pairs. The reason is that ρ-adjacent pairs preserve all the necessary order information.

Different strategies for initial scores as presented in Section 5.2 should have different effects for PS reranking. We will show some observations on it. As shown in Table 4, R and NR, which only use the rank instead of text scores, outperform NTS on both TRECVID 2006 and TRECVID 2007.

In addition, R performs better than NR especially on TRECVID 2006. The reason could be as follows. In R, the preference strength for 1-adjacent pairs equals 1 in each query. In NR, however, the preference strength for 1-adjacent pairs is 1/N, which is different among queries. Based on the statistics, N varies from 52 to 1400 in TRECVID 2006 and from 28 to 1400 in TRECVID 2007. The optimal parameters, such as the tradeoff parameter c, should be different according to the preference strength, as can be observed in the optimization objective. Since in our experiment the parameters are globally selected, it is more appropriate to assign each query with equal preference strength for 1-adjacent pairs, i.e., R is much better in this situation

TABLE 4

MAP comparison of different rstrategies.

| Method | TRECVID 2006 | | TRECVID 2007 | |
|---|---|---|---|---|
| | MAP | Gain | MAP | Gain |
| Text Baseline | 0.0381 | — | 0.0306 | — |
| NTS | 0.0382 | 0.26% | 0.0310 | 1.31% |
| NR | 0.0387 | 1.57% | 0.0402 | 31.37% |
| R | 0.0461 | 21.00% | 0.0445 | 45.42% |

K is an important parameter when constructing the graph G. A larger K can ensure more relevant samples being connected to each other, however, the edges between relevant and irrelevant samples will be added, too, which could degrade the performance because the score consistency between relevant and irrelevant samples is not necessary. With a smaller K, the "incorrect" edges will be eliminated while some of the "correct" edges between relevant samples are also missed, which will weaken the necessary consistency.

Figure 9:
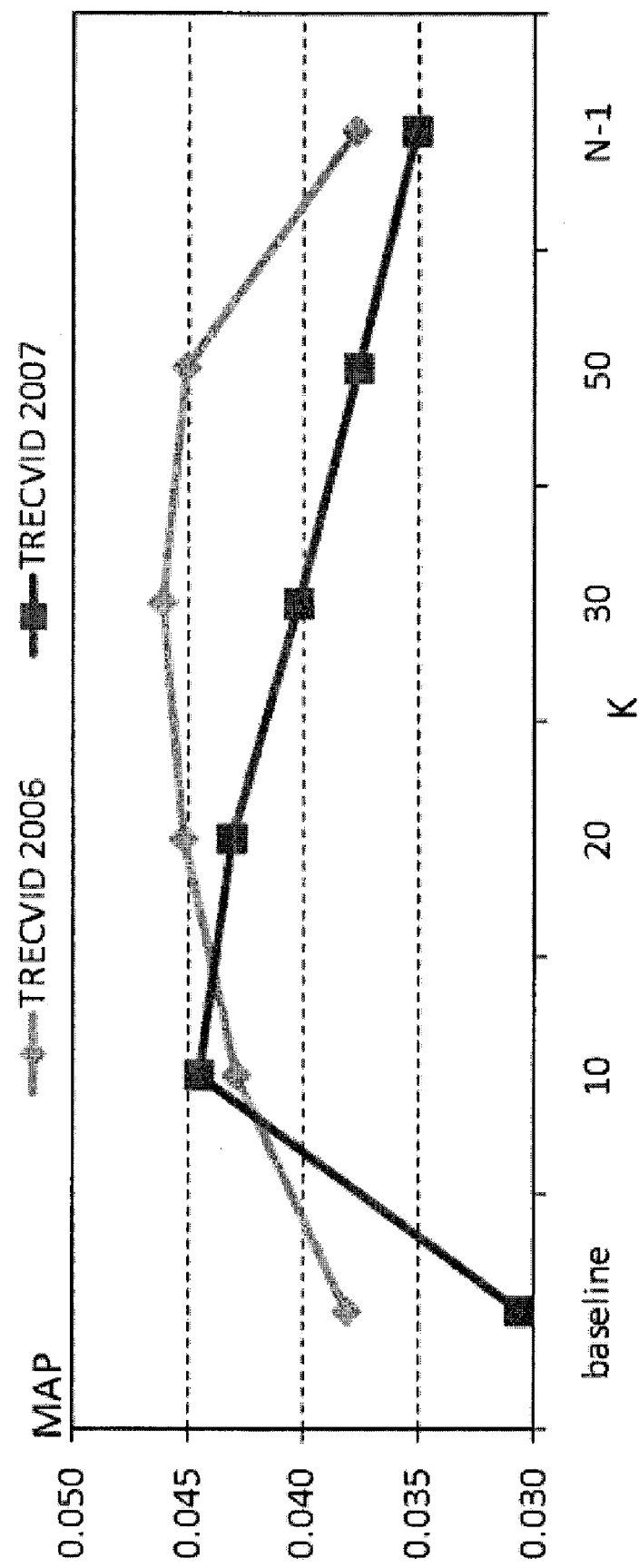
FIG. 9 illustrates a performance chart with different K values.

In FIG. 9, the MAP-K curve is presented, where K=N−1 means the graph is fully connected. As illustrated, on both TRECVID 2006 and 2007, the MAP increases with K growing and arrives at a peak at a certain K. However, the MAP will decrease gradually with K larger than the peak point.

Specifically, on TRECVID 2006 the maximum MAP (0.0461) is obtained at K=30 while on TRECVID 2007 the maximum MAP (0.0445) is achieved at K=10. As analyzed from the data, the average numbers of relevant samples across queries are 55 in TRECVID 2006 and 24 in TRECVID 2007. We can observe that the optimal K are about half the average number of relevant samples. This can provide a rough guideline in setting K in the future practical application.

The trade-off parameter c is used to balance the effects of the two terms: consistency regularization and the ranking distance. A larger c indicates that more information is preserved from the text search baseline into the reranked list. When c=∞, the reranked list will be the same as the initial one if all the pairs are used. A smaller c means that the visual consistency term plays a major role in reranking. When c=0, the result would be totally dominated by the visual consistency regardless of the initial ranking score list at all.

As illustrated in FIG. 10, the performance varies according to different c. The reranking method used is PS Reranking and only 1-adjacent pairs are used. We can see that the MAP increases with c growing and arrives at the peak at c=100 on TRECVID 2006 while on TRECVID 2007 the MAP gets the peak at c=0.01.

As shown before, the MAP of the text search baseline of TRECVID 2006 and 2007 are 0.0381 and 0.0306 respectively. However, the performance of TRECVID 2007 text search baseline is dominated by the query219 ("the Cook character in the Klokhuis series") while it would reduce to 0.0139 if such a query is removed. Basically, a larger c (100) is appropriate for a better text search baseline as in TRECVID 2006, while a smaller c (0.01) for worse text search baseline as in TRECVID 2007. It can be concluded that the trade-off parameter c can be set according to the performance of text search baseline.

c is also related to the number of pairs used. Specifically, on TRECVID 2006, the optimal c is 100, 10 and 0.01 respectively for 1-adjacent, 10-adjacent and (N−1)-adjacent pairs.

In this application, a general framework for video search reranking is proposed which explicitly formulate reranking into a global optimization problem from the Bayesian perspective. Under this framework, with two novel pair-wise ranking distances, two effective video search reranking methods, hinge reranking and preference strength reranking, are proposed. The experiments conducted on the TRECVID dataset have demonstrated that our methods outperform several existing reranking approaches.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method for improving the ranking of a document search system, the method comprising:
   obtaining video data, wherein the video data includes features of a number of individual videos;

extracting the features from the video data;

obtaining a query descriptive of a subset of individual videos of the video data;

obtaining a ranked list of individual videos, wherein the ranking of the individual videos is based on a search technique using text associated with the videos; and re-ranking the ranked list of individual videos, wherein the individual videos are re-ranked based at least in part on maximizing a product of (i) a conditional prior that is indicative of a consistency of ranking scores among individual videos in which the extracted features of the individual videos are determined to be visually similar, and (ii) a likelihood that is reflective of a disagreement between the ranked list of individual videos and the re-ranked list.

2. The method of claim 1 wherein re-ranking the ranked list of individual videos involves the use of a quadratic optimization technique.

3. The method of claim 2 wherein the quadratic optimization technique utilizes:

$$\min_r \frac{1}{2} \sum_{i,j} w_{ij}(r_i - r_j)^2 + c \sum_{(i,j) \in S_r^-} \xi_{ij}^2$$

$$\text{s.t. } r_i - r_j \geq a - \xi_{ij}, \text{ when } x_i \succ_r x_j.$$

where $\xi_{ij}$ is a slack variable, $r_n$ is a sample of a ranking score, $x_n$ is a sample from a sample set, $w_{ij}$ is a weight on the edge between nodes $r_i$ and $r_j$, a is a constant, and c is a scaling parameter.

4. The method of claim 1 wherein re-ranking the ranked list of individual videos involves the use of a preference strength technique.

5. The method of claim 4 wherein the preference strength technique utilizes:

$$2\overline{L}r = \overline{c}$$

where $\overline{L}$ is the Laplacian matrix and r is a sample of a ranking score.

6. The method of claim 1, wherein obtaining video data and extracting the features from the video data are executed when the search system is crawling the videos from the Web.

7. An image search system for improving the ranking, the image search system including a processor and a memory, the system comprising:

a component for obtaining image data, wherein the image data includes features of a number of individual images;

a component for extracting the features from the image data, wherein the processor executes instructions stored in the memory to extract the features from the image data;

a component for obtaining a query descriptive of a subset of individual images of the image data;

a component for obtaining a ranked list of individual images, wherein the ranking of the individual images is based on a search technique using text associated with the videos; and a component for re-ranking the ranked list of individual images, wherein the individual images are re-ranked based at least in part on maximizing a product of (i) a conditional prior that is indicative of a consistency of ranking scores among individual images in which the extracted features of the individual images are determined to be visually similar, and (ii) a likelihood that is reflective of a disagreement between the ranked list of individual images and the re-ranked list, and wherein the processor executes instructions stored in the memory to re-rank the ranked list of individual images.

8. The system of claim 7 wherein re-ranking the ranked list of individual images involves the use of a quadratic optimization technique.

9. The system of claim 8 wherein the quadratic optimization technique utilizes:

$$\min_r \frac{1}{2} \sum_{i,j} w_{ij}(r_i - r_j)^2 + c \sum_{(i,j) \in S_r^-} \xi_{ij}^2$$

$$\text{s.t. } r_i - r_j \geq a - \xi_{ij}, \text{ when } x_i \succ_r x_j.$$

where $\xi_{ij}$ is a slack variable, $r_n$ is a sample of a ranking score, $x_n$ is a sample from a sample set, $w_{ij}$ is a weight on the edge between nodes $r_i$ and $r_j$, a is a constant, and c is a scaling parameter.

10. The system of claim 7 wherein re-ranking the ranked list of individual images involves the use of a preference strength technique.

11. The system of claim 10 wherein the preference strength technique utilizes:

$$2\overline{L}r = \overline{c}$$

where $\overline{L}$ is the Laplacian matrix and r is a sample of a ranking score.

12. The system of claim 7, wherein obtaining image data and extracting the features from the image data are executed when the search system is crawling the videos from the Web.

13. The system of claim 7, wherein extracting features includes extracting data that describes color, edge, and texture.

14. The image search system of claim 7, wherein the individual images are re-ranked based at least in part on maximizing a product of the conditional prior and the likelihood.

15. A computer-readable storage media comprising computer executable instructions to, upon execution, perform a process method for improving ranking scores of a document search system, the process including:

obtaining video data, wherein the video data includes features of a number of individual videos;

extracting the features from the video data;

obtaining a query describing a subset of individual videos of the video data;

obtaining a ranked list of individual videos, wherein the ranking of the individual videos is based on a search technique using the text; and re-ranking the ranked list of individual videos, wherein the individual videos are re-ranked based at least in part on maximizing a product of (i) a conditional prior that is indicative of a consistency of ranking scores among individual videos in which the extracted features of the individual videos are determined to be visually similar, and (ii) a likelihood that is reflective of a disagreement between the ranked list of individual videos and the re-ranked list.

16. The computer-readable storage media of claim 15, wherein the process of re-ranking the ranked list of individual videos involves the use of a quadratic optimization technique.

17. The computer-readable storage media of claim 16, wherein the quadratic optimization technique utilizes:

$$\min_r \frac{1}{2}\sum_{i,j} w_{ij}(r_i - r_j)^2 + c \sum_{(i,j)\in S_r^-} \xi_{ij}^2$$

$$\text{s.t. } r_i - r_j \geq a - \xi_{ij}, \text{ when } x_i \succ_r x_j.$$

where $\xi_{ij}$ is a slack variable, $r_n$ is a sample of a ranking score, $x_n$ is a sample from a sample set, $w_{ij}$ is a weight on the edge between nodes $r_i$ and $r_j$, a is a constant, and c is a scaling parameter.

18. The computer-readable storage media of claim 15, wherein the process of re-ranking the ranked list of individual videos involves the use of a preference strength technique.

19. The computer-readable storage media of claim 18, wherein the preference strength technique utilizes:

$$2\overline{L}r = \overline{c}$$

where $\overline{L}$ is the Laplacian matrix and r is a sample of a ranking score.

20. The computer-readable storage media of claim 15, wherein obtaining video data and extracting the features from the video data are executed when the search system is crawling the videos from the Web.

21. The computer-readable storage media of claim 15, wherein extracting features includes extracting data that describes color, edge, and texture.

22. The computer-readable storage media of claim 15, wherein the individual videos are re-ranked based at least in part on maximizing a product of the conditional prior and the likelihood.

* * * * *